July 7, 1936.  T. SLONCZEWSKI  2,046,704

OWEN BRIDGE

Filed April 10, 1935

INVENTOR
T. SLONCZEWSKI
BY
ATTORNEY

Patented July 7, 1936

2,046,704

UNITED STATES PATENT OFFICE 2,046,704

OWEN BRIDGE

Thaddeus Slonczewski, New York, N. Y., assignor to Bell Telephone Laboratories, Incorporated, New York, N. Y., a corporation of New York Application April 10, 1935, Serial No. 15,728

7 Claims. (Cl. 175—183)

This invention relates to devices for measuring electrical quantities and particularly to that type of device known as an alternating current bridge.

The rapid progress in the art of electrical communication has resulted in a large demand for apparatus, particularly coil wound apparatus, manufactured to meet severe electrical requirements. Since the manufacture of such apparatus on a commercial basis is inherently dependent upon the ability of the manufacturer to measure rapidly and accurately its electrical constants, considerable attention must be given to the design of measuring equipment. Some of the important measurements to be made are those of effective inductance and resistance, and one of the most practical means for ascertaining these quantities is the Owen bridge. This bridge provides an indirect method of making measurements, and in one form it includes a resistance in one ratio arm and a capacitance in the other, while the unknown and a variable resistance are connected in the branch opposite the capacitance ratio arm and a variable resistance and a variable capacitance are employed in series as standards in the arm opposite the resistance ratio arm.

To be practical from a manufacturer's standpoint, the values sought to be measured should be readable directly from the measuring equipment, and should not depend upon calculations to be made subsequently to the measurement. The structure of the Owen bridge, however, is such that direct readings are possible for only a single frequency, or at best, for a narrow band of frequencies, and for other frequencies certain corrections must be calculated and added to the direct readings before a complete and accurate measurement can be secured. This results from the presence of residual capacitances and inductances in the arms of the bridge. One ratio arm is a resistance and the other a capacitance, and corrections can be avoided only if the impedance vectors representing the two arms are at right angles to each other. The phase angle of a condenser suitable for use in the bridge is usually constant with frequency, but the phase angle of the resistance, however, increases with frequency due to the effect of distributed capacitance and inductance, and as a result, the difference in phase between the two arms does not remain 90 degrees for all frequencies. This difference must be considered before the final value can be determined.

The direct reading properties of the Owen bridge may be destroyed under other conditions than those mentioned above. For example, if the effective resistance of the apparatus under test is greater than the value of the resistance in that branch when the test terminals are short-circuited, a circuit balance cannot be obtained if the capacitance in the balance arm remains fixed. To obtain a balance under this condition the capacitance must be decreased, and unless it is varied in such a way that its subdivisions act as an extension to the resistance in the test branch, the direct reading properties of the circuit cannot be maintained.

It is the object of this invention to improve the Owen bridge so that it can be used to give direct readings of effective inductance and effective resistance over a wide range of frequencies and for large values of these quantities.

A feature of this invention is a corrective inductance which is insertable into the resistance ratio arm of the bridge and by means of which a constant phase angle may be maintained between the ratio arms irrespective of frequency.

Another feature is a variable condenser and a balanced arm the capacitance of which is made to vary in steps of such a magnitude that the dial of the condenser can be calibrated to read directly the effective resistance of the coil under investigation.

In its preferred form, this invention comprises an Owen bridge having a resistance ratio arm, a capacitance ratio arm, a test arm with a variable resistance therein to secure an initial balance, and a balance arm in which are connected a variable condenser and a variable resistance by which a balance may be secured. A special inductance, constructed in such a manner as to have a constant reactance with frequency is connected in series with the resistance in the resistance ratio arm. The variable condenser in the balance arm is made to vary in steps in harmonic progression so that it is, in effect, an extension of the resistance in the test arm.

In the accompanying drawing.

It is understood that the circuit is properly shielded to eliminate electrostatic coupling between the component parts of the circuit and the body capacity effect of the operator.

Figure 1:
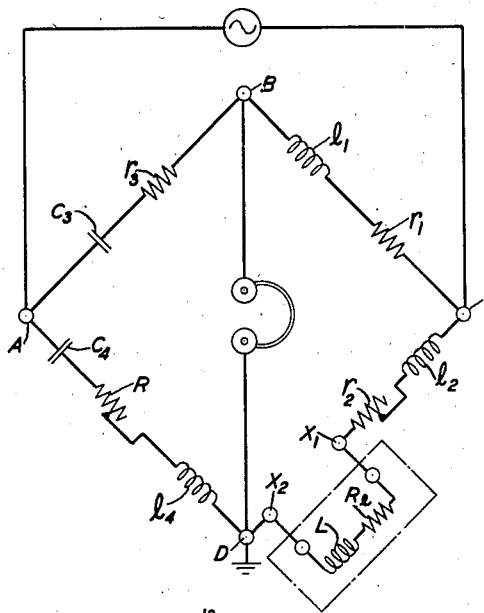
Fig. 1 is a schematic wiring diagram of a simple Owen bridge with parasitic impedances.

Referring now to Fig. 1 for a general consideration of the Owen bridge, $C_3$ is the AB ratio arm capacitance, $r_1$ is the BC ratio arm resistance, R and $C_4$ are the AD balance arm resistance and capacitance respectively, and $r_2$ is the test balance arm resistance which is used to obtain an initial balance of the circuit. The series effective resistance of $C_3$ is shown as $r_3$, and $l_1$, $l_2$ and $l_4$ are shown as the series effective inductances of $r_1$, $r_2$ and R, respectively. The apparatus to be measured is connected to terminals $X_1$, $X_2$ and consists of an inductance L and a series effective resistance $R_e$. Although $C_4$ possesses a series effective resistance, this factor is not considered separately as it may be considered a part of R and its effect eliminated by the zero bridge balance to be described later. There is no appreciable self-inductance in the AB arm.

If the impedances between the four points of the bridge be $Z_{AB}$, $Z_{BC}$, $Z_{CD}$ and $Z_{AD}$, the necessary and sufficient conditions for balance are that $$Z_{AB} Z_{CD} = Z_{BC} Z_{AD} \quad (1)$$

now $$Z_{AB} = r_3 - \frac{j}{\omega C_3}$$

$$Z_{CD} = (R_e + r_2) + j\omega(L + l_2)$$

$$Z_{BC} = r_1 + j\omega l_1$$

$$Z_{AD} = R + j\left(\omega l_4 - \frac{1}{\omega C_4}\right).$$

Substituting and separating the reals from the imaginaries, $$L + l_2 = C_3 r_1 R - C_3\left[r_3(R_e + r_2) + \omega^2 l_1 l_4 - \frac{l_1}{C_4}\right] \quad (2)$$

$$R_e + r_2 = \frac{r_1 C_3}{C_4} + \omega^2 C_3[r_3(L + l_2) - R l_1 - r_1 l_4]. \quad (3)$$

If a preliminary balance be made with $X_1$ and $X_2$ short-circuited, that is, with L and $R_e$ equal to zero, (2) and (3) reduce to $$l_2' = C_3 r_1 R' - C_3\left[r_3 r_2' + \omega^2 l_1 l_4' - \frac{l_1}{C_4}\right] \quad (4)$$

$$r_2' = \frac{r_1 C_3}{C_4} + \omega^2 C_3[r_3 l_2' - R' l_1 - r_1 l_4'] \quad (5)$$

where $l_2'$, $l_4'$, $R'$ and $r_2'$ are the respective values of the indicated quantities for the zero balance condition. Subtracting (4) from (2) and omitting negligible quantities $$L = C_3 r_1 (R - R') + (l_2' - l_2) \quad (6)$$

$(l_2' - l_2)$ is ordinarily of small value if $r_2$ is designed to have a low phase angle and may, therefore, be neglected except when inductances having a small ratio of inductance to effective resistance are to be measured. In any event, the maximum error due to $(l_2' - l_2)$ may be calculated for the worst conditions and included in the statement of accuracy for the circuit.

If the circuit is adjusted so that the R rheostat reads zero when $X_1$ and $X_2$ are short-circuited, any setting of R will then read $(R - R')$ directly and the circuit can be made direct reading for inductance. Each unit of resistance will then be equivalent to a definite unit of inductance.

Subtracting (5) from (3)

$$R_e = (r_2' - r_2) + \omega^2 C_3[r_3(L + l_2 - l_2') - r_1(l_4 - l_4') - l_1(R - R')] \quad (7)$$

Let $$\omega(L + l_2 - l_2') = X + x_2 - x_2'$$

$$\omega C_3 r_3 = \frac{1}{Q_3}$$

$$\omega(l_4 - l_4') = x_4 - x_4'$$

$$\frac{\omega l_1}{r_1} = \frac{x_1}{r_1} = q_1$$

$$\omega(R - R_1) = \frac{\omega(L + l_2 - l_2')}{C_3 r_1} = \frac{X + x_2 - x_2'}{C_3 r_1}$$

or $$\omega C_3 r_1 = \frac{X + x_2 - x_2'}{R - R'}$$

$$\frac{x_4 - x_4'}{(R - R')} = q_4$$

Substituting in (7) and simplifying $$R_e = (r_2' - r_2) - (X + x_2 - x_2')\left(\frac{1}{Q_3} + q_1 + q_4\right) \quad (8)$$

In general, $(x_2 - x_2')$ may be neglected and Equation (8) reduces to $$R_e = (r_2' - r_2) - X\left(\frac{1}{Q_3} + q_1 + q_4\right) \quad (9)$$

The second term in (9) represents a relatively large correction which may be of the order of 20 to 30 per cent of the measured value of $R_e$. This correction will disappear if $$\frac{1}{Q_3} + q_1 + q_4 = 0$$

This condition cannot be met in general unless $$\frac{1}{Q_3} + q_1 = 0 = q_4$$

$q_4$ can be made to approach zero by designing the R rheostat to have a very small phase angle, that is, as near zero reactance as possible. The remainder of the expression may be made approximately or even exactly equal to zero by the following adjustment:

In the equation $$\frac{1}{Q_3} + q_1 = 0$$

$\frac{1}{Q_3}$ is the tangent of the phase difference angle of the AB arm and $q_1$ is the tangent of the phase angle of the BC arm. If these two angles are equal, then the equation holds, i. e., the sum of the two angles is zero. This condition can be easily fulfilled for any particular frequency, but, in general, the usual type of adjustment will not hold over a range of frequencies, since $\frac{1}{Q_3}$ and $q_1$ are different functions of frequency. For practical purposes $\frac{1}{Q_3}$ may be assumed to be a linear function of frequency over that portion of the audio frequency range for which the compensation must be made. Once this function is determined by the measurement of $\frac{1}{Q_3}$ at two frequencies, for example at 1000 and 3000 cycles per second, the reactance in the BC arm may be adjusted as described below so that $q_1$ is represented by the same function.

Figure 2:
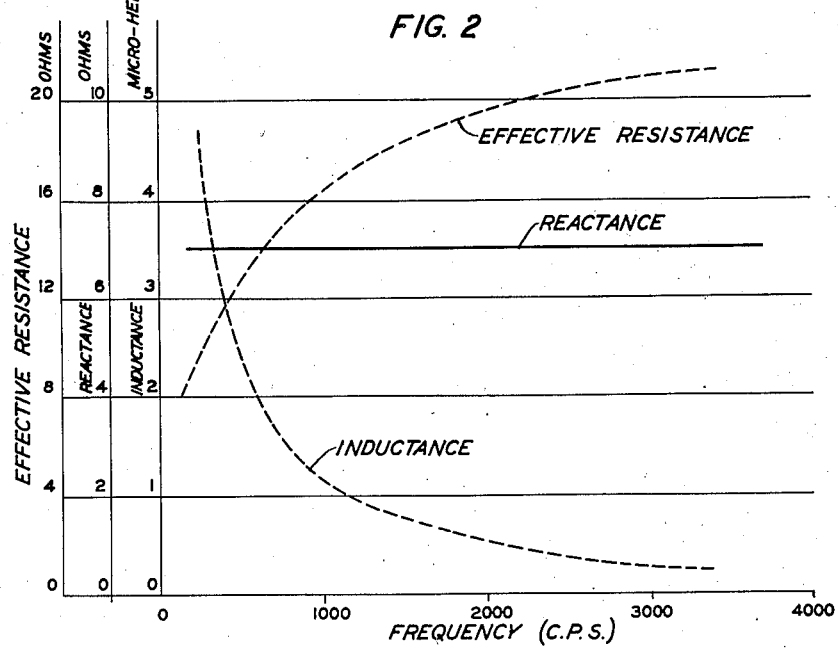
Fig. 2 is a graph showing the characteristics of the ratio arm adjusting coil.

As the function representing $\frac{1}{Q_1}$ may have any particular slope, positive, zero or negative, with frequency and may have some reactance at zero frequency, the inductance in the BC arm must vary with frequency in such a way that the function representing $q_1$ not only has the desired slope, but is likewise displaced from the frequency axis sufficiently to have the same reactance at zero frequency. To obtain this condition an unusual circuit element must be added, namely, an inductance which is a function of frequency. I have found that such an element can be constructed and adapted to this use. One method of obtaining such an element consists in plotting the permeability of various core materials against frequency on a logarithmic scale and selecting that material which has a curve nearest to a slope of 45 degrees. Such a material will have eddy current losses which react upon the inductance of a coil associated therewith in such a way that the inductance is inversely proportional to frequency. One form that the element may take comprises a coil of 35 turns of No. 20 copper wire wound toroidally on a core of chrome-permalloy containing 35 laminations, each lamination being 0.014 inch thick, the inside diameter of the laminations being 2 inches and the outer diameter being approximately 2½ inches. The characteristics of such a coil are shown in Fig. 2. It is seen that the reactance of the coil is constant with frequency.

Figure 3:
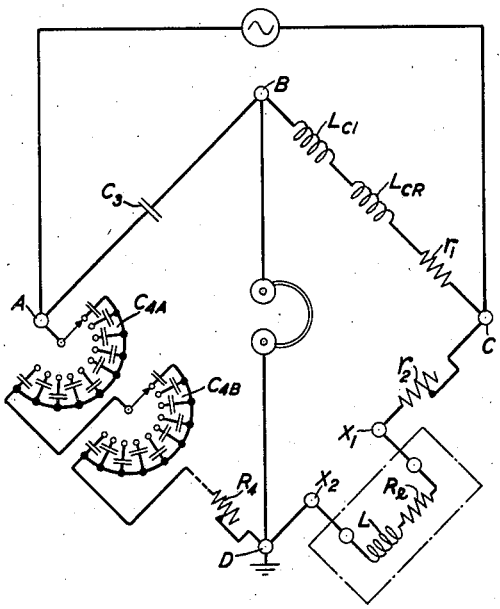
Fig. 3 is a wiring diagram of the Owen bridge showing the novel ratio arm adjusting coil and the condenser divided into steps in harmonic progression.

Although the phase difference of the condenser used as a ratio arm has been assumed to be constant over the frequency range to be covered by the bridge, a more accurate statement would be that the phase difference is equal to the sum of two angles, one of which is constant with frequency and the other of which is proportional to the frequency. To obtain adequate compensation, therefore, the constant reactance coil described above must be used in series with a constant inductance coil as shown in Fig. 3. The constant reactance coil is shown in the BC arm at $L_{CR}$ and the constant inductance coil is shown at $L_{C1}$. Using the two coils in this way the phase angle of the BC arm can be adjusted so as to be equal to the phase difference of the AB arm over the desired part of audio frequency range.

If $C_4$ be fixed so that the circuit is balanced with $X_1$ and $X_2$ short-circuited and with the resistance in the CD arm equal to $r_2'$, then the value of $C_4$ is $$\frac{C_3 r_1}{r_2'}$$

If $R_e$ is greater than $r_2'$, however, a circuit balance cannot be obtained if $C_4$ remains fixed at this value. To obtain a balance under this condition $C_4$ must be decreased. It is usually convenient to vary $C_4$ in such a way that its subdivisions act as an extension to the $r_2$ rheostat so that the direct reading property of the circuit is maintained. This condition can be met by dividing $C_4$ into steps in harmonic progression, e. g.

$$C_4, \frac{C_4}{2}, \frac{C_4}{3}, \frac{C_4}{4}, \frac{C_4}{5}, \cdots \frac{C_4}{n}.$$

Ordinarily $r_2$ is a rheostat arranged in decade steps so that its total resistance is $10 \times .01 + 9(1 + 10 + 100 \ldots)$ ohms. The number of steps in the decade will depend upon the range of effective resistance to be covered. The division of the $C_4$ condenser into harmonic steps running from $C_4$ to $\frac{C_4}{10}$ in effect adds one decade to $r_2$. This arrangement is of great importance where a large range of inductance and effective resistance is to be covered since it eliminates the necessity of having a large resistance in series with the test impedance, which renders the bridge insensitive when small impedances are tested. At the same time this arrangement permits the effective extension of $r_2$ when large effective resistances are to be measured.

It is not generally feasible to indefinitely subdivide $C_4$ directly below the step $$\frac{C_4}{10}$$

in order to cover a wide range of effective resistance, since too many steps would be required. However, the range may be further extended in decade steps by connecting a second sub-divided condenser in series with $C_4$, the steps of the second condenser being in the progression $$\frac{C_4}{10}, \frac{C_4}{20}, \frac{C_4}{30}, \cdots \frac{C_4}{90}$$

so that each step of the second condenser is $10 \times r_2$ ohms. The condensers are shown in Fig. 3 at $C_{4A}$ and $C_{4B}$.

The operation of the bridge is extremely simple. The apparatus to be tested is connected to the test terminals $X_1$ and $X_2$. The inductance dials ($R_4$) and the effective resistance dials ($r_2$ and $C_4$) are then varied alternately until a bridge balance is obtained. The inductance in henries or millihenries and the effective resistance in ohms are read directly from the dial settings. The current or voltage may be adjusted to the desired value by means of suitable controls (not shown) which may be provided for that purpose.

What is claimed is:

1. The combination with a bridge of the Owen type having a resistance in one ratio arm, a capacitance in the other ratio arm, a variable resistance in the test balance arm, and a condenser in the other balance arm, of means for causing the balance arm condenser to act as an extension of the balance arm resistance so that the bridge will be direct reading when the effective resistance of the apparatus under test is greater than the resistance in the test balance arm with the test terminals short-circuited.

2. The combination as in claim 1, said balance arm condenser being divided into step the values of which vary in harmonic progression.

3. The combination with a bridge for measuring electrical quantities, said bridge having ratio arms with parasitic impedances, a variable resistance in the test balance arm, and a condenser in the other balance arm, of means for maintaining a constant phase angle between the ratio arms over a substantial range of frequencies, and means for causing the balance arm condenser to act as an extension of the balance arm resistance so that the bridge will be direct reading when the effective resistance of the apparatus under test is greater than the resistance in the test balance arm with the test terminals short-circuited.

4. A corrective element for an electrical measuring device, said element comprising a metallic core and a coil of wire wound upon the core, the eddy current losses in the core being designed to react upon the inductance of the coil to cause the inductance of the coil to be inversely proportional to the frequency of the current passing therethrough.

5. A corrective element for an electrical measuring device, said element comprising a laminated chrome permalloy core, each lamination being more than .01 inch thick, and a coil wound thereon, the eddy current losses in the core reacting upon the inductance of the coil to cause the inductance to be inversely proportional to the frequency of the current passing therethrough.

6. In combination, a bridge for measuring the effective inductance and effective resistance of a coil, said bridge comprising a resistance ratio arm, a capacitance ratio arm, a test balance arm, a variable resistance in the test balance arm, and a variable capacitance balance arm, a corrective element in the resistance ratio arm comprising a coil having constant reactance with frequency to maintain a constant phase angle between the ratio arms, and means for varying the capacitance of the capacitance balance arm in steps in harmonic progression whereby the capacitance can be made to act as an extension of the variable resistance in the test balance arm.

7. In a bridge for measuring effective inductance and resistance a capacitance ratio arm, a resistance ratio arm and means in the resistance ratio arm for maintaining a constant phase angle between the ratio arms over a substantial range of frequencies, said means comprising a constant reactance coil, and a constant inductance coil in series with one another.

THADDEUS SLONCZEWSKI.